US006048422A

United States Patent [19]

Kim, II et al.

[11] Patent Number: 6,048,422

[45] Date of Patent: Apr. 11, 2000

[54] METHOD OF APPLYING GLITTER AND THE LIKE TO NON-PLANAR SURFACES AND THREE-DIMENSIONAL ARTICLES

[76] Inventors: John Kim, II, 4144 Woodcreek, Ypsilanti, Mich. 48197; John Chinung Kim, 311 Pine Ridge Dr., Bloomfield Hills, Mich. 48304

[21] Appl. No.: 09/154,433

[22] Filed: Sep. 16, 1998

[51] Int. Cl.$^7$ ...... B32B 31/16

[52] U.S. Cl. ...... 156/73.6; 156/297

[58] Field of Search ...... 156/73.5, 73.6, 156/150, 297

[56] References Cited

U.S. PATENT DOCUMENTS

| | | | |
|---|---|---|---|
| Re. 35,160 | 2/1996 | Nichols | 43/42.53 |
| 3,010,845 | 11/1961 | Schornstheimer | 117/71 |
| 3,227,590 | 1/1966 | Kurz | 156/73.6 |
| 3,547,078 | 12/1970 | Linneborn | 118/638 |
| 3,764,067 | 10/1973 | Coffey et al. | 239/1 |
| 3,819,119 | 6/1974 | Coffey et al. | 239/337 |
| 4,605,584 | 8/1986 | Herr, Jr. et al. | 428/142 |
| 4,623,411 | 11/1986 | Pollak et al. | 156/93 |
| 4,673,599 | 6/1987 | Vanderslice | 428/10 |
| 4,760,265 | 7/1988 | Coburn, Jr. | 428/40 |
| 5,146,707 | 9/1992 | Nichols | 43/42.53 |
| 5,205,896 | 4/1993 | Brown et al. | 156/297 |
| 5,246,765 | 9/1993 | Lussi et al. | 428/203 |
| 5,263,233 | 11/1993 | Kim et al. | 24/295 |
| 5,294,657 | 3/1994 | Melendy et al. | 524/270 |
| 5,351,890 | 10/1994 | Clements | 239/143 |
| 5,639,523 | 6/1997 | Ellis | 428/34.2 |

*Primary Examiner*—James Sells

*Attorney, Agent, or Firm*—Gifford, Krass, Groh, Sprinkle, Anderson & Citkowski, PC

[57] ABSTRACT

A multi-step process promotes an even distribution of glitter particles while providing a uniform texture and appearance even with respect to non-planar and volumetric surfaces. A pneumatic spray is preferably used to urge the particles against the article and into a selectably applied adhesive while rotating and vibrating the article utilizing a suitable electromechanical transducer. The surface is then wiped to knock down particles which may have been standing on edge, preferably using an air spray at an acute angle relative to the surface. With the particles substantially flat against the surface, the adhesive is cured, and any excess particles are blown off. Following this, a passivating overcoat may be applied.

23 Claims, 4 Drawing Sheets

METHOD OF APPLYING GLITTER AND THE LIKE TO NON-PLANAR SURFACES AND THREE-DIMENSIONAL ARTICLES

FIELD OF THE INVENTION

This invention relates generally to the application of glitter and like materials for the purpose of surface decoration and, in particular, to methods whereby such materials may be consistently applied to non-planar and three-dimensional articles in a stable manner.

BACKGROUND OF THE INVENTION

Glitter is often used to decorate two-dimensional surfaces such as card stock, and so forth. In a basic method of application, a suitable adhesive is applied to the surface to be treated, through the use of spray glue, a roller, knife or brush. The glitter is sprinkled onto the surface any non-adhered material can then be removed through shaking or wiping.

The application of glitter to non-planar surfaces and volumetric objects is more problematic, however, since sprinkling only applies to a portion of the surface area at any given time, requiring the part to be rotated or the applicator to be moved relative to the part, or both. In addition, if the adhesive is heavy or poorly distributed, it may run or otherwise result in an uneven distribution of the decorative material.

Another problem that arises in the application of glitter is that upon sprinkling of the particles, some may lie flat while curing, whereas others may be affixed on-edge, resulting in exposed sharp surfaces or a non-smooth texture or appearance. The need remains, therefore, for a method whereby glitter and like decorative particles may be applied to non-planar and/or three-dimensional/volumetric objects or articles in a consistent manner to provide a uniform texture and appearance.

SUMMARY OF THE INVENTION

The present invention addresses the needs set forth above with respect to the application of glitter and like materials by providing a multi-step process that promotes an even distribution of particles and a uniform texture and appearance.

According to the inventive method, an adhesive is applied to the surface of the article being treated, preferably by rotating the article relative to an adhesive spray, having masked off portions which are not intended to receive a glitter coating. The glitter particles may be passively sprinkled onto the article through gravity feed or pneumatic application, with and without electrostatic treatment, although, in a preferred embodiment, the method utilizes a pneumatic spray containing the particles, which are forced against the article and into the selectably applied adhesive, at least to fill in gaps left through a gravity application. To ensure an even distribution of glitter upon application, the article is preferably rotated relative to the pneumatic spray and vibrated utilizing an electromechanical coupling.

Having distributed the particles of glitter within the uncured adhesive, the surface is then wiped to "knock down" particles which may have been standing on edge, thereby maximizing the extent to which the particles lie flat within the adhesive prior to curing. Although mechanical wiping mechanism may be used for such a purpose, preferably an air spray is used at an acute angle relative to the surface, thereby facilitating a pneumatic wiping. With the particles substantially flat against the surface, the adhesive is cured, and any excess particles are blown off. Following this, the glitter or sprinkles are encapsulated to realize a smooth touchable surface. Preferably, a transparent overcoat of acrylic, epoxy or some other clear drying passivating layer is used for such purpose.

DETAILED DESCRIPTION OF THE INVENTION

As discussed elsewhere herein, this invention is directed toward improved methods for applying glitter, and to the encapsulation of such sprinkle particles, glitter, and the like, so as to achieve a smooth soft-touch surface, particularly with respect to non-planar and/or volumetric or three-dimensional articles or objects. Before describing the method in detail, it should be noted that the term "glitter" should be interpreted in its usual sense, namely, small reflective flakes or particles, which may be of consistent or varying size and shape, and which are commercially available from such companies as 3M of Minneapolis, Minn., using a wide variety of technologies. But in addition, one or more the steps described below are equally applicable to other types of particulates adapted for surface preparation, whether or not in the platelet form generally associated with glitter. In addition, although the invention solves certain problems associated with non-planar and/or volumetric or three-dimensional objects and articles, some or all of the steps are applicable as well to two-dimensional and flat surfaces, the result being an improved texture and uniformity in such cases as well.

Figure 1:
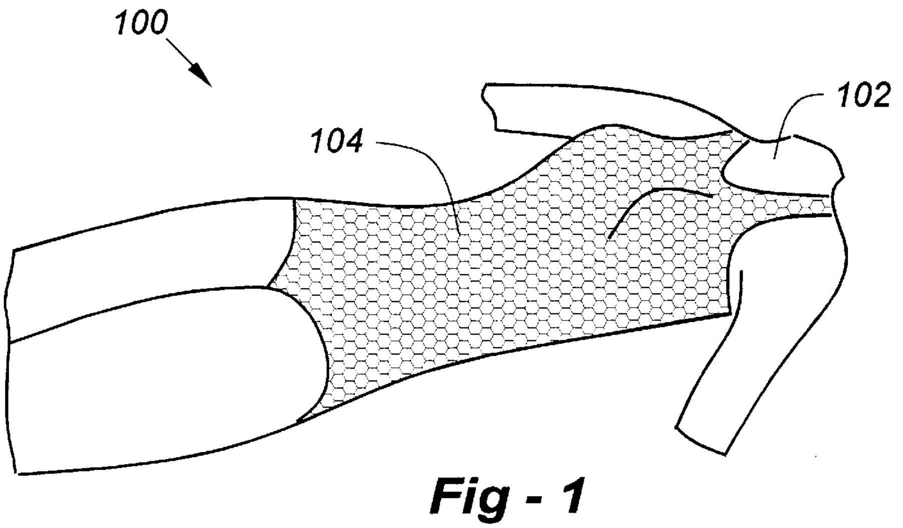
FIG. 1 depicts, from an oblique perspective, a volumetric article to which the inventive method of glitter application applies, in this case the body of child's doll.

Now turning to the figures, FIG. 1 illustrates from an oblique perspective, an article 100 to which the invention is applicable, in this case the body of a doll, wherein everything except the torso portion is masked off and treated with glitter to give the outward appearance of a bathing suit 104. Although a full-torso bathing suit 104 is shown, it will be appreciated that, in the specific application of the invention to a toy such as a doll, other clothes may be simulated according to the invention, including pants, blouses, gloves, and the like. Nor is the invention limited to the simulation of clothing, but may be used as make-up, skin texture, or any other affect on any other type of suitable surface. It will also be apparent to one of skill in the art that this application represents one of many, and that different substrate surfaces may be treated according to the principles herein by varying steps of the method or parameters such as adhesive type, vibration rate, cure time, and so forth.

Figure 2:
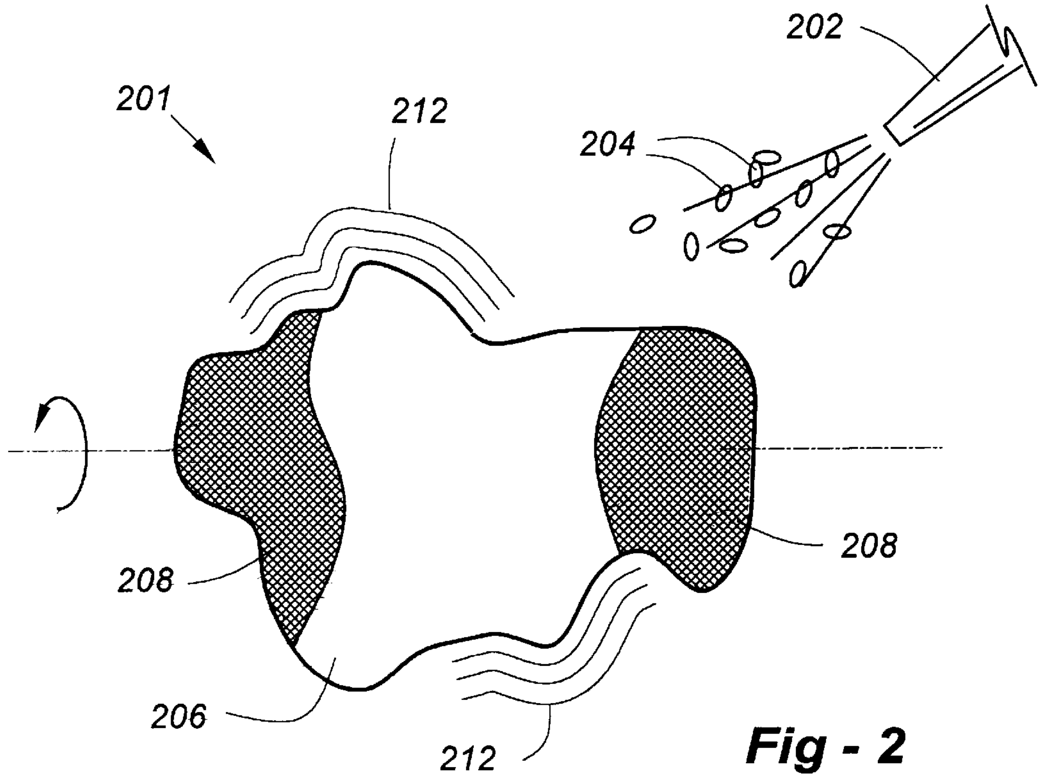
FIG. 2 is a drawing, also seen from an oblique perspective, showing the way in which glitter is pneumatically applied to an object while turning and vibrating the object.

FIG. 2 illustrates certain details regarding the way in which glitter is preferably applied to a surface according to the invention, this procedure being depicted generally at 201. Although gravity-fed sprinkling may be utilized, preferably glitter particles 204 are directed from a nozzle 202 in pneumatic fashion toward the surface 206 on an article to be coated, the surface having masked areas 208 which are not to be glitter coated. The pneumatic application is preferably carried out with a variable flow rate, with a particle size in the range of 0.005"–0.045".

As the particles 204 are delivered through nozzle 202, the article depicted generally at 201 is preferably turned or rotated relative to the spray source while, at the same time, being vibrated through an electromechanical transducer. As opposed to moving the part relative to the particle spray, the part may remain substantially stationary while the spray is moved though, in the preferred embodiment, it is vibrated in all cases to allow a greater uniformity particle application and surface distribution. A typical vibration rate is in the range of a few thousand, cycles per second, and may be generated through one of a variety of solenoid-type vibrator mechanisms which are commercially available.

Figure 3A:
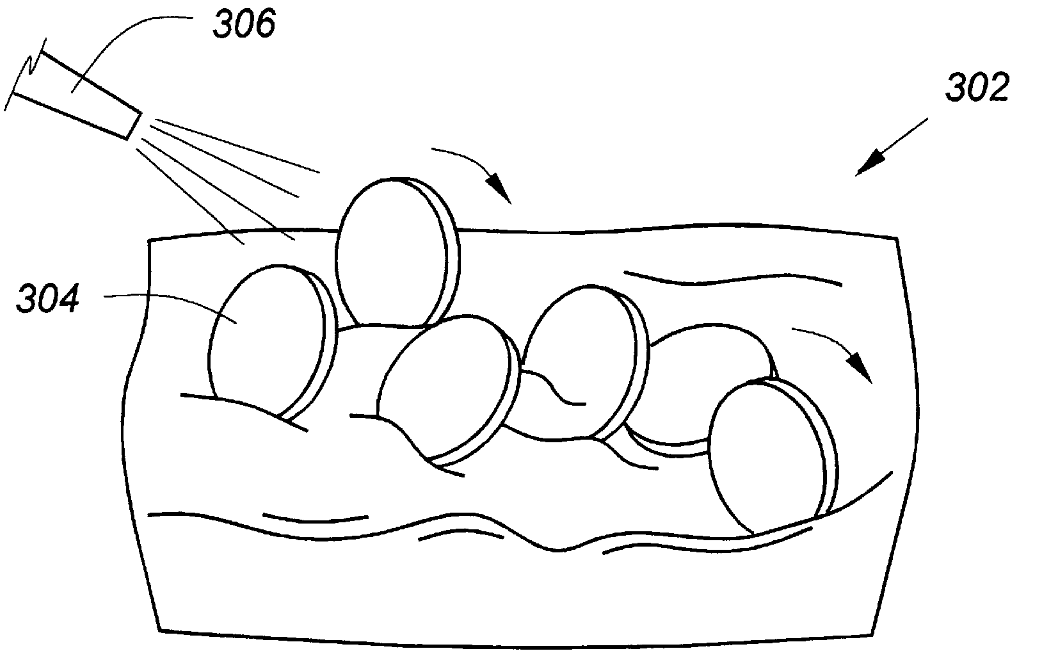
FIG. 3A is a drawing which shows how some glitter particles may stand on end through initial surface application, resulting in sharp edges or an uneven texture.
Figure 3B:
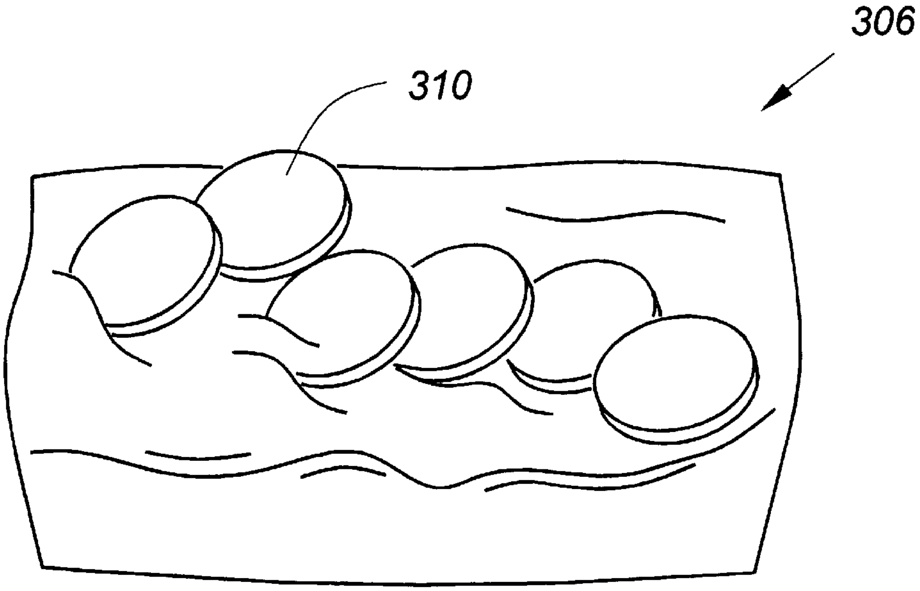
FIG. 3B illustrates how, through surface wiping, the edge-standing particles of FIG. 3A may be made to lie down, after which a transparent surface coating is preferably applied.

Now turning to FIG. 3A, while the masked adhesive is still in an uncured state, the surface is wiped or brushed so that flakes standing on end such as 304 are urged to "lie down" on the surface to minimize the presence of sharp edges and uneven texture or appearance. Although a mechanical brushing or wiping action may be used, preferably an air jet 306 is used at a relatively sharp angle with respect to the part surface as shown generally at 302, preferably at a pressure on the order of 30 to 40 psi, causing the on-end particles to lay flat and contact remaining exposed area of uncured glue.

Having pneumatically brushed the surface of the article being covered, the piece is placed in an oven to cure the adhesive, if of the thermal-setting type or other solvent-type adhesive suited to the substrate being treated. For example, using a water-based adhesive from Grow Industries, the part may be cured at 180° F. for 20 minutes. Other curing means may be used, of course, in accordance with the type of adhesive being applied. Once the glue has been set, a surface is again brushed either mechanically or pneumatically to remove any unattached particles, and an outer coating is used as a final encapsulation layer. For example, one or more layers of clear spray may be utilized for such purpose, though other coatings are equally applicable, depending upon the circumstances. The outer coating must be clear coating so as to not hinder reflectability of glitter (sparkling affect). By selecting proper top coating, its feel and appearance can be improved, giving a "safe touch" or skin feel. Multiple layers may be accomplished by duplicating top coating procedures to give the final product a very smooth surface. Each layer must be cured before the next additional coating can be applied.

Figure 4A:
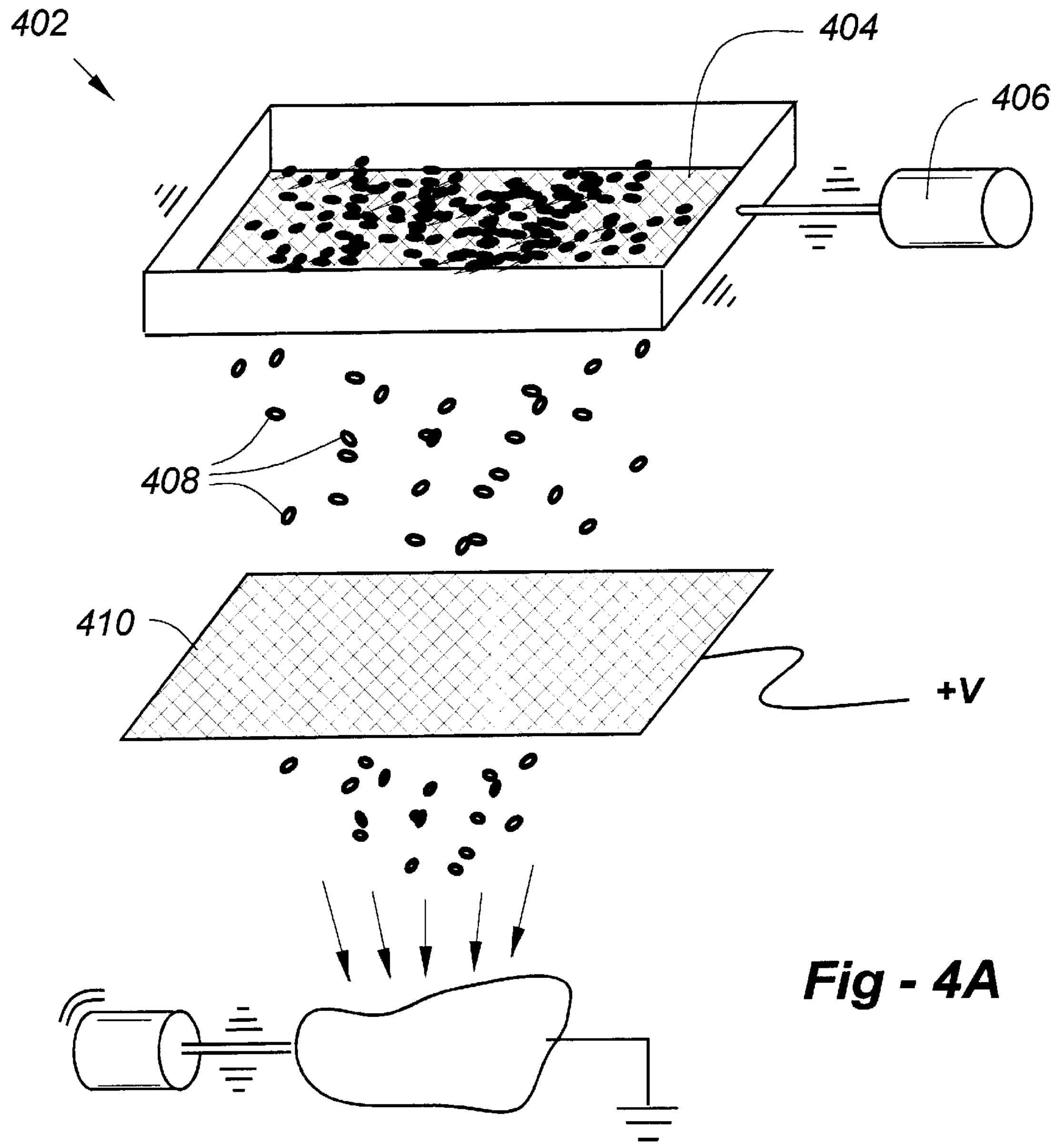
FIG. 4A illustrates, from a perspective view, the way in which a shaking screen may be employed for an even initial distribution of particles as part of a gravity-feed mechanism.

FIG. 4A shows a mechanism generally at 402 that may be used to provide an even initial distribution of particles through a gravity-feed process, for example, prior to a subsequent pneumatic application to fill in gaps. In this case, a screen 404 having a mesh on an underside surface is shaken by an electromechanical transducer 406, enabling particles 408 to fall therefrom in an evenly distributed manner in accordance with the size of the screen and glitter particles. Shaker 406 make be shaken at any appropriate rate in accordance with screen/particle size, but preferably is on the order of a few tens to a few hundreds of cycles per second. As the particles 408 fall, they may pass through a high-voltage screen 410, thereby giving the particles an electrostatic charge, such that if the substrate is appropriately grounded or otherwise held at a suitable potential, the particles 408 may be drawn thereto with a desired orientation. The screen 410 may typically have a charge on the order of a few thousand to tens of thousands of volts to achieve this affect.

Figure 4B:
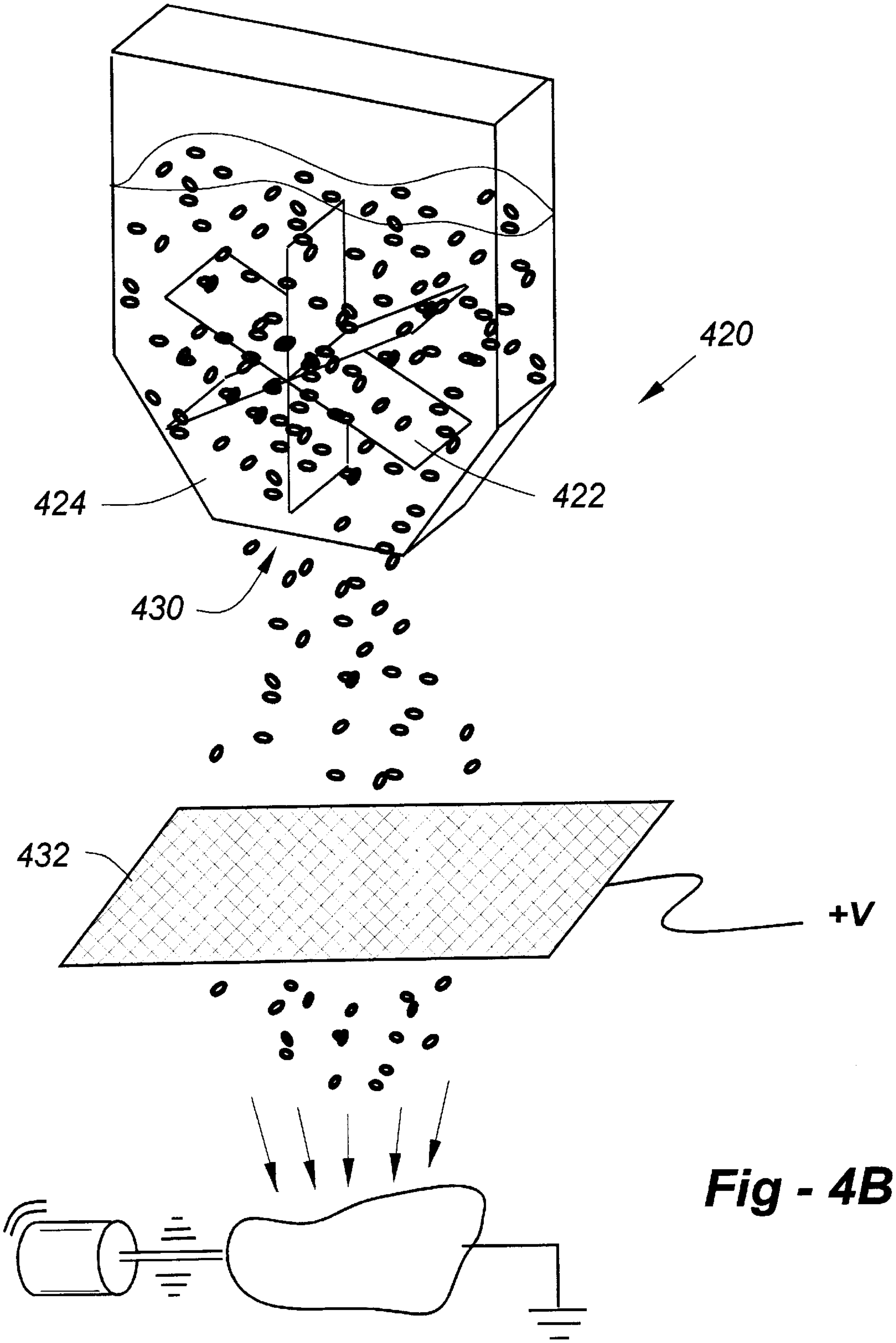
FIG. 4B illustrates an alternative apparatus utilizing a roller brush technique and electrostatic treatment, which may also be used in conjunction with the shaking screen of FIG. 4A.

FIG. 4B shows an alternative apparatus generally at 420, wherein a rotating brush 422 is used to carry particles 424 contained in a hopper through a bottom portion 430 which may also contain a screen mesh, resulting in an even distribution of particles 432. As in the case of FIG. 4A (and in other embodiments disclosed herein) an electrostatic charge may be applied through a high-voltage screen 432 to achieve an attractive force and/or even distribution based upon an electrostatic treatment.

We claim:

1. A method of applying decorative particles to the surface of an object, comprising the steps of:

applying adhesive to the surface of the object in the area destined to receive the decorative particles;

vibrating the object while applying the decorative particles from a particle source to the area containing the adhesive; and curing the adhesive.

2. The method of claim 1, wherein the decorative particles are glitter particles.

3. The method of claim 1, wherein the step of vibrating the object while applying the decorative particles includes applying the particles through gravity while vibrating the object.

4. The method of claim 1, wherein the step of vibrating the object while applying the decorative particles includes pneumatically applying the particles while vibrating the object.

5. The method of claim 1, wherein the step of vibrating the object while applying the decorative particles includes electrostatically applying the particles while vibrating the object.

6. The method of claim 1, wherein the step of applying adhesive to the surface of the object in the area destined to receive the decorative particles includes the step of masking off areas of the object not destined to receive the decorative particles.

7. The method of claim 1, further including the step of wiping the surface of the object after the particles are applied but before the adhesive is cured to lay down particles standing on end.

8. The method of claim 7, wherein the step of wiping the surface of the object includes pneumatically wiping the surface.

9. The method of claim 1, wherein the object includes a non-planar surface, and wherein the method further includes the step of moving at least one of the object and the source while vibrating the object and applying the decorative particles.

10. The method of claim 9, wherein the object is rotated while vibrating the object and applying the decorative particles.

11. The method of claim 1, wherein the object is a three-dimensional object.

12. The method of claim 11, wherein the three-dimensional object is part of a vehicle.

13. The method of claim 11, wherein the three-dimensional object is a toy.

14. The method of claim 13, wherein the toy is a doll.

15. The method of claim 1, further including the step of applying a final passivating layer to encapsulate the adhered decorative particles.

16. A method of applying decorative particles to the surface of a three-dimensional object, comprising the steps of:

applying adhesive to the surface of the object in the area destined to receive the decorative particles;

applying the decorative particles from a particle source to the area of the surface containing the adhesive while moving at least one of the object and the source and vibrating the object; and curing the adhesive.

17. The method of claim 16, wherein the decorative particles are glitter particles.

18. The method of claim 16, further including the step of masking off areas of the object not destined to receive the decorative particles.

19. The method of claim 16, further including the step of wiping the surface of the object after the particles are applied but before the adhesive is cured to knock down particles standing on end.

20. The method of claim 19, wherein the step of wiping the surface of the object includes pneumatically wiping the surface.

21. The method of claim 16, wherein the object is a toy.

22. The method of claim 21, wherein the toy is a doll.

23. The method of claim 16, further including the step of applying a final passivating layer to encapsulate the adhered decorative particles.

* * * * *